May 19, 1942.  F. NELL  2,283,280
COLLAPSIBLE TAP
Filed April 3, 1940  2 Sheets-Sheet 1

Inventor
Frederic Nell
By Strauch & Hoffman
Attorneys

May 19, 1942.  F. NELL  2,283,280
COLLAPSIBLE TAP
Filed April 3, 1940  2 Sheets-Sheet 2

Inventor
Frederic Nell

By Strauch & Hoffman
Attorneys

Patented May 19, 1942

2,283,280

UNITED STATES PATENT OFFICE 2,283,280

COLLAPSIBLE TAP

Frederic Nell, Waynesboro, Pa., assignor to Landis Machine Company, Waynesboro, Pa., a corporation of Pennsylvania Application April 3, 1940, Serial No. 327,731

19 Claims. (Cl. 10—95)

This invention relates to collapsible taps of the type used to cut internal screw threads in tubing, tubular goods, and related products, and although they are primarily intended for cutting straight threads, they are not limited to such use because tapered threads may be cut by utilizing tap chasers incorporating the correct taper therein.

The tap of the present invention is somewhat similar to that disclosed in United States Patent 2,028,075 which issued to me on January 14, 1936. The primary difference is that the tap of this invention is designed to be both tripped and reset by a single mechanical means, such as the yoke mechanism of a threading machine, whereas my prior tap utilized a work actuated tripping mechanism and a separate manually or mechanically actuated resetting mechanism, depending upon whether the tap was intended to remain stationary or to rotate. Accordingly, the primary object of this invention is to provide a tap structure incorporating a novel tripping and resetting mechanism that is especially adapted for mechanical actuation but which may also be manually actuated.

Another important object of my invention is to provide a tap structure that is exceptionally compact and adapted for application to threading machines wherein the space for a tapping mechanism is inherently limited. My novel dual tripping and resetting mechanism enables me to considerably reduce the total length of my tap structure and, simultaneously, to limit the maximum diameter thereof within a range which makes my new tap structure applicable to classes of work which require unusual tool rigidity and compactness.

Another object of my invention is to provide a tap structure incorporating means to produce accurate thread lengths and one which also is capable of being tripped at any instant during the thread-cutting operation without stopping the machine.

In my aforementioned patented tap structure, the length of thread was established by having the end of the tube contact the work actuated member of the tripping train. Due to the fact that the tube end was not always free from surface irregularities nor necessarily free from chip burrs, minor variations in thread length were experienced. Also, it was practically impossible to trip the tap manually, for this would have necessitated the operator exposing himself to possible injury from both the tap and the pipe end should he attempt to push the work actuated member rearwardly with his hands. By actuating the dual tripping and resetting mechanism of my present tap by means of a yoke mechanism, such as is usually employed on threading machines, it is possible to obtain very uniform thread lengths; and also the tap may be tripped by an automatic stop, or it may be tripped manually at any desired instant.

A further object of my invention is to provide improved collapsing spring arrangement which serves to efficiently centralize the collapsing force and thereby avoid minor misalignment and subsequent binding of the tap members.

Another object is to provide a tap having a pivoted latch, with means for rapidly swinging the latch clear of the latching surface as soon as the latch is tripped, so that wear thereof is avoided.

A further object of my invention is to provide a tap having a movable latch and a sliding control member for controlling the latch, with means whereby after the latch is tripped and the tap collapsed, movement of the control member in one direction will simultaneously restore the latch to latched condition and also return the plunger to cutting position.

Another object is to provide a tap having a pivoted latch, with a control member which, when moved in one direction, will trip the latch, and when moved in the opposite direction will move the plunger toward cutting position and simultaneously return the latch to latched condition.

Further objects of my invention will become apparent as the specification proceeds in connection with the annexed drawings, and from the appended claims. In the drawings:

Since the tap of this invention and the tap of Patent No. 2,028,075 employ many parts in common, I will describe those parts first.

Figure 1:
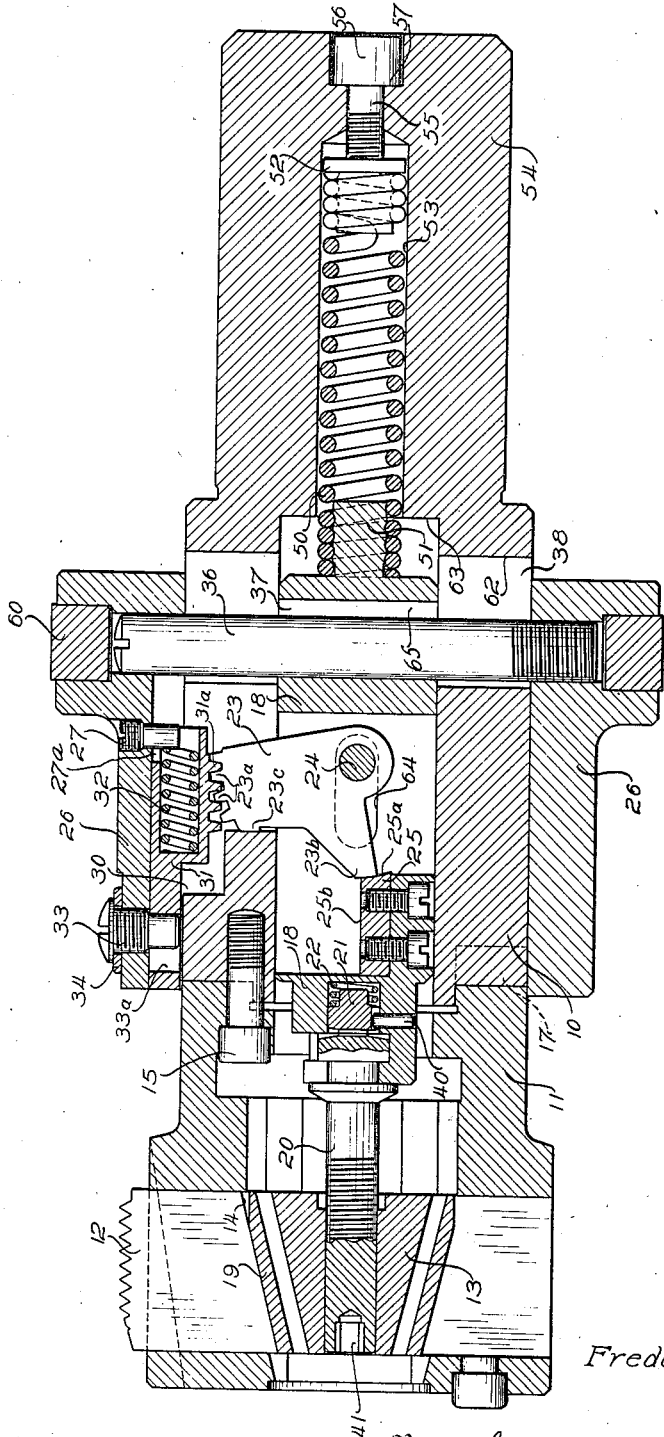
Figure 1 is a longitudinal cross-sectional view of a tap embodying the invention, the tap being shown in its thread-cutting or latched position.

Referring now to the drawings, wherein like reference characters have been employed to designate like parts throughout the several views thereof, and more particularly to Figure 1, the reference character 10 indicates a stock or body portion to which heads 11 of various sizes may be attached as by means of screws 15. Head 11 carries thread-cutting elements or tap chasers 12 which are radially slidable in slots therein. The inner edges of chasers 12 are provided with grooves 14, which are engaged by tongues 19 provided on plunger head 13. An integral lug 17 on head 11 engages a slot in the forward end of body 10 to key the head to the tap body. The plunger head 13 is secured, by means of an adjusting pin 20, to a plunger 18. The axial position of the head 13 determines the radial position of the thread-cutting elements 12. It is apparent that when head 13 is in its outermost position the threading elements will be in their outmost radial or thread-cutting position, and that when head 13 is retracted the thread-cutting elements will be drawn inward out of engagement with the work, whereby the tap may freely be withdrawn from the work.

Pin 20 has an enlarged end which engages a socket in the forward end of the plunger 18. A locking element 21 has a serrated forward end, which engages the similarly serrated end of pin 20. A spring 22 surrounds locking element 21 and urges it into engagement with the enlarged end of pin 20. A pin 40 is employed to prevent the locking element 21 from turning. Pin 20 also has a polygonal socket 41, into which a wrench may be inserted for rotating pin 20 to adjust the head 13 axially, and thereby to effect a diametrical adjustment of chasers 12. The coacting serrations on the end of pin 20 and locking pin 21 hold pin 20 in a locked axial position, so that jarring vibrations cannot affect the diametrical setting of chasers 12. The structure so far described is shown in said Patent No. 2,028,075. The novel latch and chaser control mechanism of the present invention will now be described.

Plunger 18 is locked in its forward or thread-cutting position by means of latch member 23. Latch 23 has teeth 23a and is pivotally mounted on a pin 24, which projects through slots 64 in plunger 18 and is secured in body 10. Plunger 18 is recessed to receive a hardened latch plate 25, having a curved latching face 25a, against which the outer surface of an arm 23b of the latch member engages to hold the plunger in its forward position. The coacting surfaces of the latch 23 and latch plate 25 are made concentric with the center of pin 24 with the parts in the position shown in Figure 1, so that a true surface contact is obtained. This also insures that the plunger will be held stationary when the latch is moving toward unlatched position. Member 25 is also provided with a riding face 25b, upon which the latch rides during the resetting operation, as will be hereinafter pointed out.

The latch member coacts with a rack member 31 which is mounted for longitudinal sliding movement between body 10 and a collar 26 which surrounds the said tap body. Member 31 projects into an opening 30 in body 10 and has rack teeth 31a meshing with teeth 23a of latch 23. One end of member 31 is bored to receive a spring 32 which presses against the end of the bore and against an abutment stud 27 threaded into collar 26. Thus, spring 32, at all times, urges member 31 forwardly with respect to collar 26. To limit the amount of forward movement of the rack, an abutment stud 33 is threaded into collar 26 and engages a slot 33a in member 31. A washer 34 is preferably used to provide a better seat for the head of stud 33 on collar 26.

Collar 26 is loosely connected to plunger 18 by a cross pin 36. Pin 36 is threaded into the collar and seats in a slot 37 in plunger 18. Pin 36 projects through a similar but longer slot 38 located in body 10, so that the latter does not interfere with relative axial movement of the collar and the plunger.

Plunger member 18 is constantly urged rearwardly by the action of a collapsing spring 50 which normally is under an appreciable tension, even when the tap is in its collapsed condition. Spring 50 is disposed in a bore 53 in a shank portion 54 provided on body 10, and its front end is tightly coiled and threadedly attached to a suitably grooved extension 51 of plunger 18. Its rear end is similarly threadedly attached to a suitably grooved nut 52 located in bore 53. Nut 52 is threaded onto spring tension adjusting screw 55, having a head 56 located within a counterbore 57 in shank 54. Rotating screw 55 moves nut 52 longitudinally and results in increasing or decreasing the tension of the spring 50, depending upon the direction of said rotation.

By having the spring coacting grooving of spring nut 52 of the same hand as the thread of screw 55, and by having the grooving of the extension 51 of plunger 18 of a different hand, spring tension adjustments may be made without any possibility of affecting the connection between the collapsing spring and coacting grooved members 51 and 52. However, by making the pitch diameter of the grooving slightly larger than the pitch diameter of the tightly coiled ends of spring 50, or by making the pitch of the said grooving slightly larger or smaller than that of the tightly coiled ends of spring 50, it is possible to employ groovings of the same hand, and which need not necessarily be the same as that of screw 55.

As shown in Figure 1, the left-hand end of spring 50 has left-handed convolutions and is threaded onto correspondingly shaped grooves on member 51, while the right-hand end has right-handed convolutions fitting in correspondingly shaped grooves in nut 52, and the latter is secured by right-handed threads to screw 55.

Accordingly, the collapsing force of spring 50 may be readily adjusted and since it applies forces to the center of the plunger, no binding action can occur.

Referring now to Figure 1, the tap is shown in its thread-cutting or latched condition, and it is evident that the force exerted by collapsing spring 50 is exactly centered and will maintain the latching surfaces of latch 23 and latch plate 25 in constant abutment during the threading operation. Spring 32 constantly urges rack member 31 forwardly. This, together with the fact that the center of pressure on the latching surfaces of latch 23 and latch plate 25 lies below the center of the latch pivot pin 24, assures having the tap securely locked until the desired thread length has been cut. A face 23c of the latch engages a surface of the body to limit movement of the latch.

The tap may be utilized in any desired manner to thread the work. For instance, it may be rotated and the work held stationary during the threading operation, or if desired the tap may be held stationary and the work rotated. Similarly, either the tap or the work may be advanced longitudinally by the lead screw to cut a thread of the desired pitch. Irrespective of the particular manner in which the tap is operated during the threading operation, it is tripped at the desired point by moving control collar 26 to the right (Figure 1) with respect to body 10. The particular tap shown is adapted to be rotated during the threading operation, so collar 26 is preferably provided with a yoke groove in which a yoke ring 60 rotatably seats. A yoke mechanism (not shown) cooperates with yoke ring 60 in well known manner to effect longitudinal movement of collar 26.

Upon the completion of the threading operation, the yoke mechanism is either manually or automatically actuated to pull collar 26 rearwardly with respect to body 10. This results in a corresponding rearward movement of rack member 31, by virtue of stud 33 abutting the end of slot 33a. The rearward movement of the rack 31 just described results in a proportional clockwise rotation of the latch 23 through the meshing teeth 23a and 31a. However, the tap is not tripped until the latching surface of arm 23b is fully disengaged from face 25a of latch block 25. No rearward motion of plunger 18 can occur until the latching surfaces have lost contact with each other, because until that time arm 23b rotates about a fixed center, and face 25a is so shaped as to neither increase nor decrease with respect to the axis of pin 24 during the first part of the tripping operation.

When the operation just discussed is carried to the point where latch 23 is disengaged from surface 25a, the tap is tripped and spring 50 pulls plunger 18 rearwardly into engagement with a stop face 63 in body 10. Rearward movement of collar 26 continues until cross pin 36 engages rear walls 62 of recess 38. During the last stage of movement of member 26 a clearance 65 develops between pin 36 and slot 37. During this operation head 13 cams chasers 12 inwardly, thereby releasing the tap from the work, and latch 23 is lifted free of riding face 25b of latch plate 25, (into the position shown in Figure 2) thereby avoiding sliding contact and consequent wear therebetween. The tap is now in collapsed condition, with the parts in the positions shown in Figure 2.

The important feature of the above described instantaneous tripping action is that it precludes any possibility of having the last few threads incorporate any taper of the type resulting from tripping mechanisms which permit the plunger to be moved rearwardly a slight distance during the tripping period. The provision of slots 37 and 38 assures that there will be no interference to the rearward movement of pin 36, by either plunger 18 or tap body 10, and the upper portion of slot 38 assures freedom from interference to the rearward movement of abutment screw 27 and of rack member 31.

Figure 2:
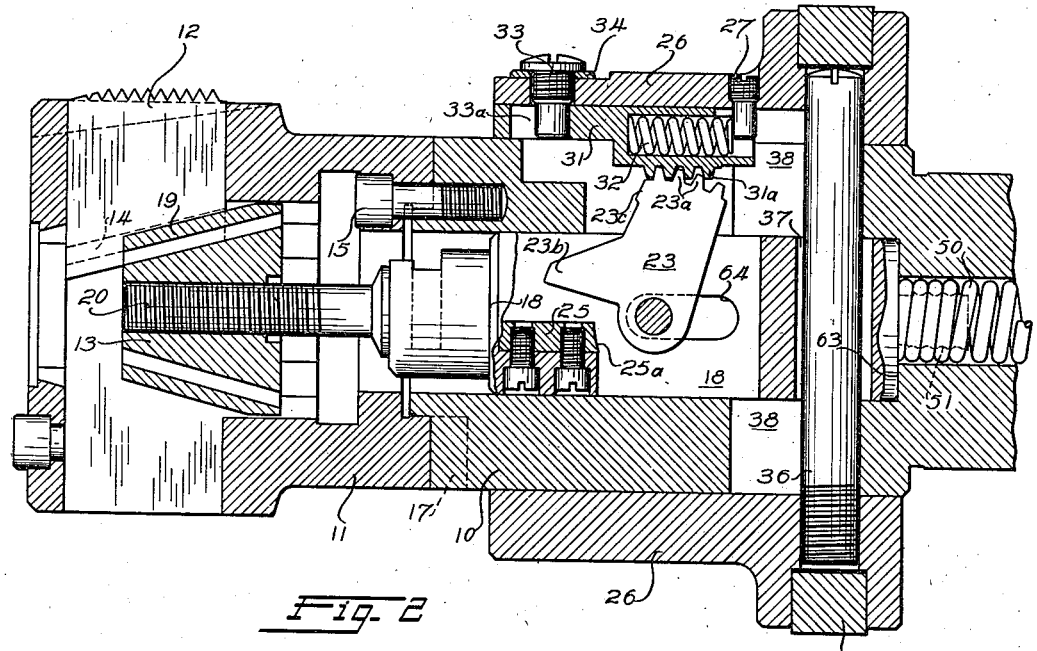
Figure 2 is a similar view but shows the tap in its collapsed position.
Figure 3:
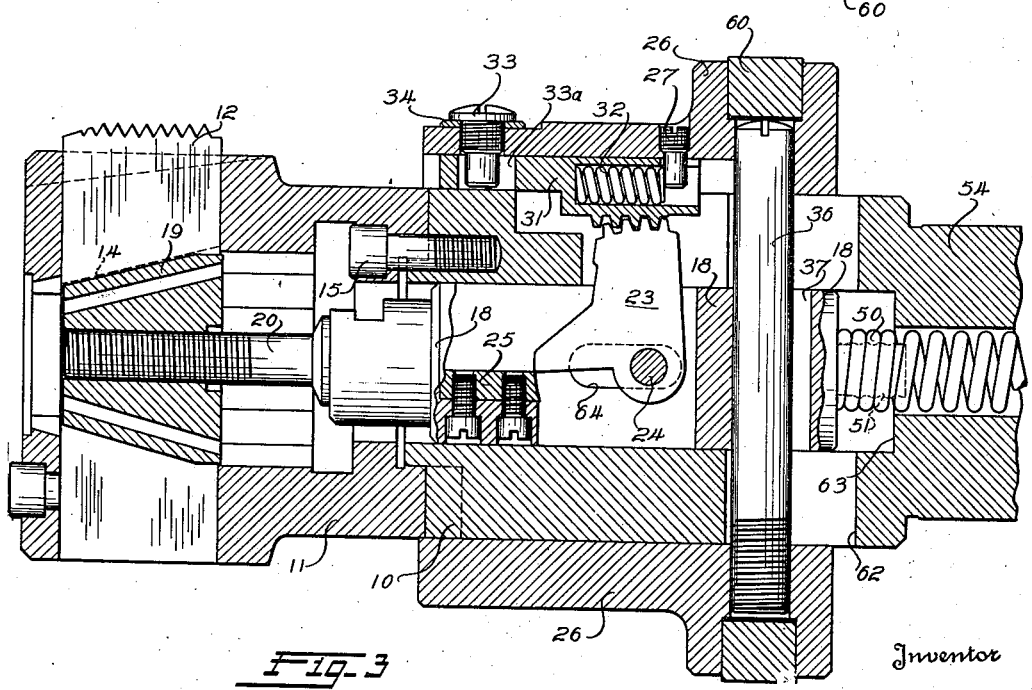
Figure 3 is another similar view but shows the tap at the instant when it reaches latching position.

Now, to reset the tap to its original threading position, the yoke mechanism is actuated to push collar 26 forwardly or to the left in Figures 2 and 3. The forward movement of collar 26 first tends to compress the spring 32 because of abutment 27 acting thereagainst. This results in rotating latch 23 counterclockwise until the lower edge of its latching surface abuts riding surface of latch plate 25. Thereafter, further movement of collar 26 causes spring 32 to be gradually compressed and stud 33 to move away from the end of slot 33a in rack member 31, since the latter is restrained against further movement through engagement of latch member 23 with riding face 25b. A slot 27a in member 31 allows the latter to move rearwardly with respect to stud 27.

Immediately after the phase of operation just described, pin 36 takes up clearance 65 and engages plunger 18, so thereafter the plunger and collar 26 move forwardly as a unit against the tension of collapsing spring 50. As the plunger continues to be pushed forwardly by pin 36, the lower edge of latch 23 rides upon the riding surface of latch plate 25 until the position shown in Figure 3 has been reached. When this position is reached, the now appreciably compressed spring 32 quickly pushes rack member 31 forwardly against abutment 33, and rocks latch 23 counter-clockwise to bring its latching surface into abutment with latch surface 25a. The tap now assumes the position of Figure 1, in condition for another threading operation.

From the foregoing description of the structure and operation of my tap, it is evident that I have achieved material improvements over the tap shown in my prior patent. My present tap is equally adapted to use in either a stationary or a rotating position; likewise, it can be tripped and reset either automatically or manually. By eliminating the work actuating member incorporated in my former tap, I am able to apply my present tap to machines having a limited diametrical clearance. Also, by providing it with my novel dual tripping and resetting mechanism, and providing a yoke groove directly in the collar, I have appreciably shortened the length thereof, and no longer have to employ a separate member, located rearwardly of the collar, to reset the tap. Moreover, it is now possible for me to apply my present tap to several makes of machines to which I could not apply my former one—this being due to the greater compactness and smaller overall dimensions which I now can effect. Further, the lower edge of the latch is in contact with the upper surface of the latch plate only during the resetting operation. Consequently, the dragging action which does occur produces no appreciable wear, as compared with the "biting in" action which would occur if the latch edge were moved forwardly against the upper surface of the said latch plate, as in my prior tap. Further, in the new tap the collapsing spring force now acts directly upon, and centrally of the plunger member and not indirectly thereon, as is the case in my said patented structure. Therefore, there is less tendency for the collar to bind on the tap body due to any unequal spring tension such as could occur in my prior tap, which incorporated a plurality of collapsed springs.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a collapsible tap, a body; a plurality of tap chasers mounted for inward and outward movement on said body; a plunger longitudinally slidable within said body and operable to hold said chasers outwardly when it is disposed in a forward position; resilient means urging said plunger rearwardly; latch means for locking said plunger in said forward position; a control collar movable longitudinally of the body; means actuated by the collar for tripping said latch and allowing said resilient means to collapse said chasers, when said collar is moved in one direction; and means also actuated by the said collar for returning said plunger to said forward position against the action of said resilient means and restoring said latch to locked condition when said control collar is moved in the opposite direction, said collar having a yoke ring for moving it in either direction.

2. In a threading device, a body having inwardly and outwardly movable thread cutting elements and a longitudinally movable member operable to maintain said elements in thread-cutting position when it is disposed in a predetermined position; resilient means acting upon said member; a movable latch on said body for holding said member in said predetermined position against the action of said resilient means; a control collar slidable longitudinally on said body and having lost-motion means for tripping said latch when it is moved in one direction, to allow said resilient means to move said member out of said predetermined position, said collar also having means so connecting it to said member, that when it is moved in the opposite direction it will restore said member to said predetermined position, said lost-motion means permitting said latch to remain stationary until said member is returned to said predetermined position.

3. In a threading apparatus, a body having inwardly and outwardly movable threading chasers and a longitudinally movable member operable to maintain said chasers in threading position when it is disposed in a predetermined position; resilient means acting upon said member; a movable latch for holding said member in said predetermined position against the action of said resilient means; a control collar slidable longitudinally on said body and having a positive connection with said latch when it is moved in one direction, for tripping said latch and allowing said resilient means to move said member out of said predetermined position, said collar also having means so connecting it to said member that when it is moved in the opposite direction it will restore said member to said predetermined position, said collar having a yieldable connection with said latch, when said collar is moved in said opposite direction, so that said latch may remain stationary until said member is returned to said predetermined position.

4. In a threading device, a body having inwardly and outwardly movable threading elements and a longitudinally movable member operable to maintain said elements in threading position when it is disposed in a predetermined position; resilient means acting upon said member; a movable latch for holding said member in said predetermined position against the action of said resilient means; a control collar slidable longitudinally on said body and having means for tripping said latch when it is moved in one direction, to allow said resilient means to move said member out of said predetermined position, said collar also having means so connecting it to said member that when it is moved in the opposite direction it will restore said member to said predetermined position, said collar having spring means for transmitting forces to said latch when said collar is moved in said opposite direction, so that said latch is held stationary and stresses are built up in said spring means while said collar is returning said member to said predetermined position, said spring means being operable to restore said latch to locked condition when said member attains said predetermined position.

5. In a threading device, a body having a longitudinally movable member for controlling thread cutter movements; resilient means acting upon said member; a latch pivoted on said body and cooperating with a latch face on said member for holding the latter in a predetermined position against the action of said resilient means, said member also having a riding face adjacent said latching face and disposed substantially parallel to the axis of said body; control means for moving said latch out of engagement with said latching face and being operable to maintain said latch out of engagement with said riding face; and means, so connecting said control means to said member that the latter may be returned to said predetermined position against the action of said resilient means and said latch restored to locking position by moving said control means in one direction.

6. In a thread cutting apparatus, a body having a longitudinally movable member for controlling thread cutter movements; resilient means acting upon said member; a latch pivoted on said body and cooperating with a latch face on said member for holding the latter in a predetermined position against the action of said resilient means, said member also having a riding face adjacent said latching face and disposed substantially parallel to the axis of said body; and control means for moving said latch out of engagement with said latching face, to allow said resilient means to move said member in one direction and being operable to maintain said latch out of engagement with said riding face while said member is moving in said one direction; means so connecting said control means to said member that the latter may be returned to said predetermined position against the action of said resilient means by moving said control means in the opposite direction, and means so connecting said control means to said latch that the latter is resiliently pressed against said riding face when said member is moving to said predetermined position.

7. In a thread cutting apparatus, a body having a longitudinally movable member for controlling thread cutter movements; resilient means acting upon said member; a latch pivoted on said body and cooperating with a latch face on said member for holding the latter in a predetermined position against the action of said resilient means, said member also having a riding face adjacent said latching face and disposed substantially parallel to the axis of said body; and control means, comprising a longitudinally movable collar, for moving said latch out of engagement with said latching face, to allow said resilient means to move said member, said control means being operable to maintain said latch out of engagement with said riding face when said member is moving under the action of said resilient means; and means so connecting said collar to said member that the latter may be returned to said predetermined position against the action of said resilient means by moving said collar in one direction, said collar having spring means urging said latch toward locking position and maintaining it in contact with said riding face during movement of said member to said predetermined position.

8. In a thread cutting apparatus, a body having a chaser-controlling plunger slidable therein; spring means urging said plunger in one direction; a latching face and a riding face provided on said plunger, said faces being contiguous and said riding face lying in a plane parallel to the axis of said plunger; a latch pivoted on said body for rocking movement about an axis disposed substantially normal to the axis of said body and having an arm cooperating with said latching and riding faces, said latching face being so curved as to constitute a portion of a cylinder generated by a line swung about the pivotal axis of said latch, and the locus of the point or surface of contact of said latch arm defining the same arc and therefore being at all times coincident with said latching surface when in latched relation, whereby said latch may be rocked to the point of complete disengagement from said latching face without producing movement of said plunger.

9. The apparatus defined in claim 8, wherein the arm of said latch is of curved form having the same radius of curvature as said latching face, whereby they cooperate in surface engagement with each other when said latch is in locking position.

10. In a threading device, a body having thread-cutting chasers movably mounted thereon; a plunger for controlling said chasers mounted for longitudinal movement with respect to said body and having resilient means urging it in one direction; a latch pivoted on said body and cooperating with a latching face on said plunger to hold the latter in a predetermined position; a longitudinally movable control collar having lost-motion means connecting it to said latch and lost-motion means connecting it to said plunger, whereby it may be moved in one direction independently of said plunger to release said latch from said latching face, and allow said plunger to move into collapsing position, and may be moved in the opposite direction to return said plunger to said predetermined position without effecting locking movement of said latch until said predetermined position is reached.

11. In a threading device, a body having thread-cutting chasers movably mounted thereon; a plunger for controlling said chasers mounted for longitudinal movement with respect to said body and having resilient means urging it in one direction; a latch pivoted on said body and cooperating with a latching face on said plunger to hold the latter in a predetermined position; a longitudinally movable control collar having lost-motion means connecting it to said latch and lost-motion means connecting it to said plunger, whereby it may be moved in one direction independently of said plunger to release said latch from said latching face, and allow said plunger to move into collapsing position, and may be moved in the opposite direction to return said plunger to said predetermined position without effecting locking movement of said latch until said predetermined position is reached, said first-named lost-motion means comprising an element mounted for movement independently of said collar, and spring means urging said element toward an abutment on said collar.

12. In a thread cutting device, a body having thread cutters movably mounted thereon; a plunger for controlling said cutters mounted for longitudinal movement with respect to said body and having resilient means urging it in one direction; a latch pivoted on said body and cooperating with a latching face on said plunger to hold the latter in a predetermined position; a longitudinally movable control collar having lost-motion means connecting it to said latch and lost-motion means connecting it to said plunger, whereby it may be moved in one direction independently of said plunger to release said latch from said latching face, and allow said plunger to move into collapsing position, and may be moved in the opposite direction to return said plunger to said predetermined position without effecting locking movement of said latch until said predetermined position is reached, said second-named lost-motion means comprising a transverse element secured to said collar and projecting through, and having longitudinal play with respect to the walls of an opening provided in said plunger.

13. In a threading device, a body having a longitudinally movable member for controlling thread cutter movement; resilient means acting upon said member; a latch for holding said member in a predetermined position against the action of said resilient means; a longitudinally movable element for controlling said latch; a control collar mounted for longitudinal movement and having an abutment; spring means reacting against said collar and urging said element toward said abutment; and means connecting said collar to said member.

14. In a threading device, a body having a longitudinally movable member for controlling thread cutter movement; resilient means acting upon said member; a pivoted latch for holding said member in a predetermined position against the action of said resilient means; a longitudinally movable element; means so connecting said latch to said element that longitudinal movement of the latter will rock said latch; a control collar mounted for longitudinal movement and having an abutment; spring means reacting against said collar and urging said element toward engagement with said abutment; and means so connecting said collar to said member, that movement of said collar in one direction will trip said latch, and movement of said collar in the opposite direction will move said member toward said predetermined position against the action of said resilient means and cause said element to move away from said abutment and build up pressure in said spring means.

15. In a collapsible tap; a plunger mechanism for collapsing said tap; a tension spring constantly urging said plunger mechanism rearwardly to collapse said tap; said spring being disposed approximately symmetrically around the longitudinal axis of said tap; said tension spring being threadedly attached at one end to an extension located on the rear of said plunger mechanism and at the other end to a spring nut; a spring tension adjusting screw mounted in the shank of said tap and threaded into said nut and operable to effect a change in the tension of said tension spring.

16. In a collapsible tap; a plunger mechanism for collapsing said tap; a tension spring constantly urging said plunger mechanism rearwardly to collapse said tap; said spring being disposed approximately symmetrically around the longitudinal axis of said tap; said tension spring being threadedly attached at one end to an extension located on the rear of said plunger mechanism and at the other end to a spring nut; a spring tension adjusting screw mounted in the shank of said tap and threaded into said nut and operable to effect a change in the tension of said tension spring; the hand of the threads of said spring tension adjusting screw being the same as that of said other end of said tension spring, the hand of the coils of said one end of said tension spring being of the opposite hand.

17. In a threading device, a body having a longitudinally movable member for controlling thread cutter movement; resilient means acting upon said member; a latch pivoted about a transverse axis for holding said member in a predetermined position against the action of said resilient means and having gear teeth thereon; a longitudinally movable element for controlling said latch having rack teeth meshing with the teeth of said latch; a control collar mounted for longitudinal movement on said body and having an axially directed abutment; spring means reacting against said collar and urging said element into engagement with said abutment; said spring means and said element providing a rigid connection between said latch and collar when the latter is moved in one direction, and a yieldable connection when the collar is moved in the opposite direction; and means connecting said collar to said member.

18. In a tap, a body carrying inwardly and outwardly movable chasers; a plunger slidable longitudinally within said body and connected to said chasers; resilient means for urging said plunger toward chaser-collapsing position; a pivoted latch carried by said body adjacent the axis thereof and cooperating with a latching face on said plunger to hold the latter in thread-cutting position against the action of said resilient means; a control device slidable longitudinally on said body and operable to trip said latch and allow said resilient means to collapse said chasers when it is moved in one direction, and said control device, when moved in the opposite direction, also being operable to return said plunger to thread cutting position against the action of said resilient means and restore said latch to locked condition.

19. In a tap, a body carrying inwardly and outwardly movable chasers; a plunger slidable longitudinally within said body and connected to said chasers; resilient means urging said plunger toward chaser collapsing position; a pivoted latch for holding said plunger in thread cutting position against the action of said resilient means; a single collar structure slidable longitudinally of the body and having means for tripping said latch and permitting said resilient means to move said plunger into chaser collapsing position when it is moved in one direction; said collar structure also having means for returning said plunger to thread cutting position and for swinging said latch into locked condition when said collar structure is moved in the opposite direction.

FREDERIC NELL.